Oct. 12, 1943.  W. D. MARR  2,331,561
POWER DRIVEN SLED
Filed May 23, 1941  6 Sheets-Sheet 1
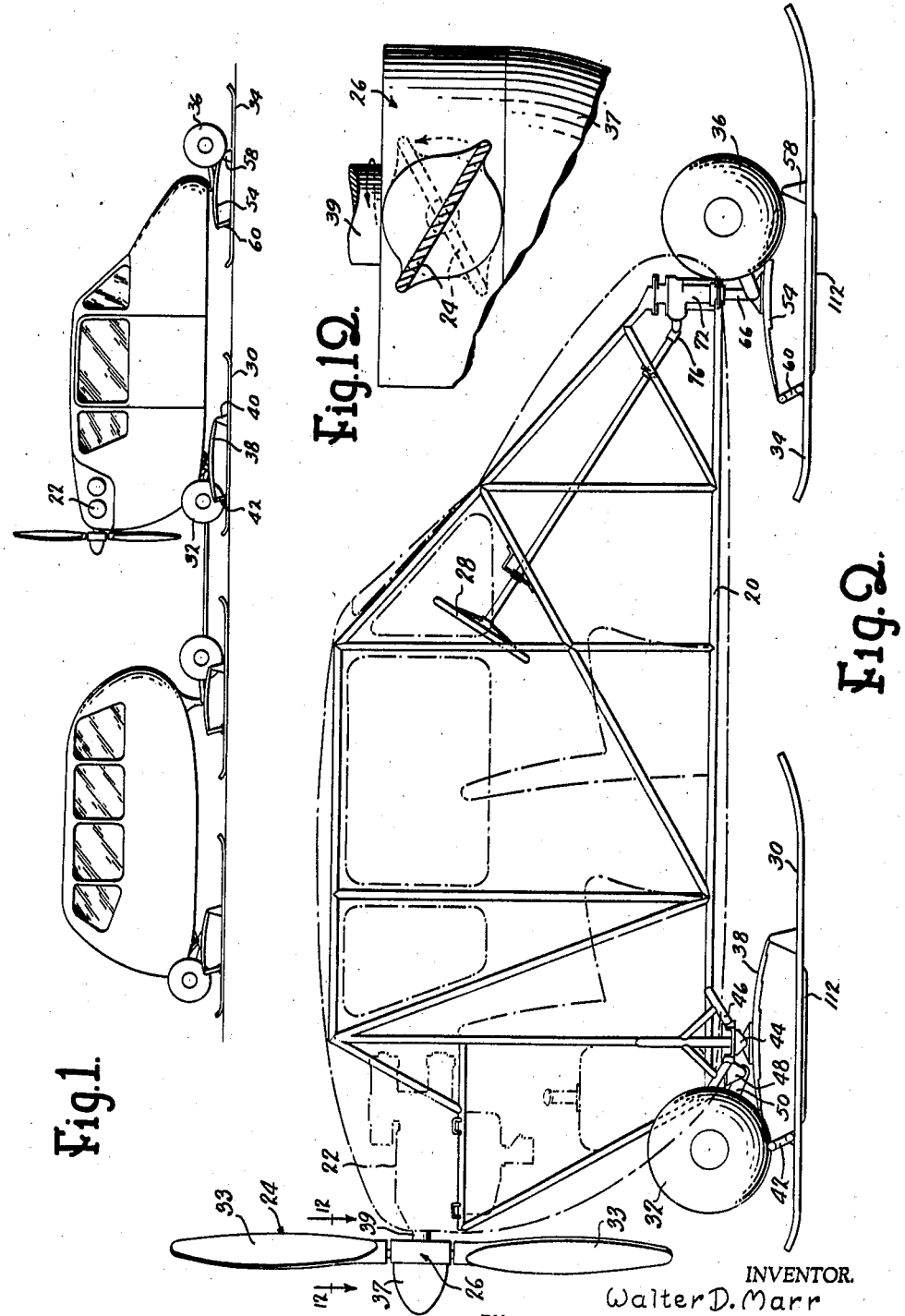
INVENTOR.
Walter D. Marr
BY Parker and Burton
Attorneys Oct. 12, 1943.  W. D. MARR  2,331,561
POWER DRIVEN SLED
Filed May 23, 1941  6 Sheets-Sheet 2
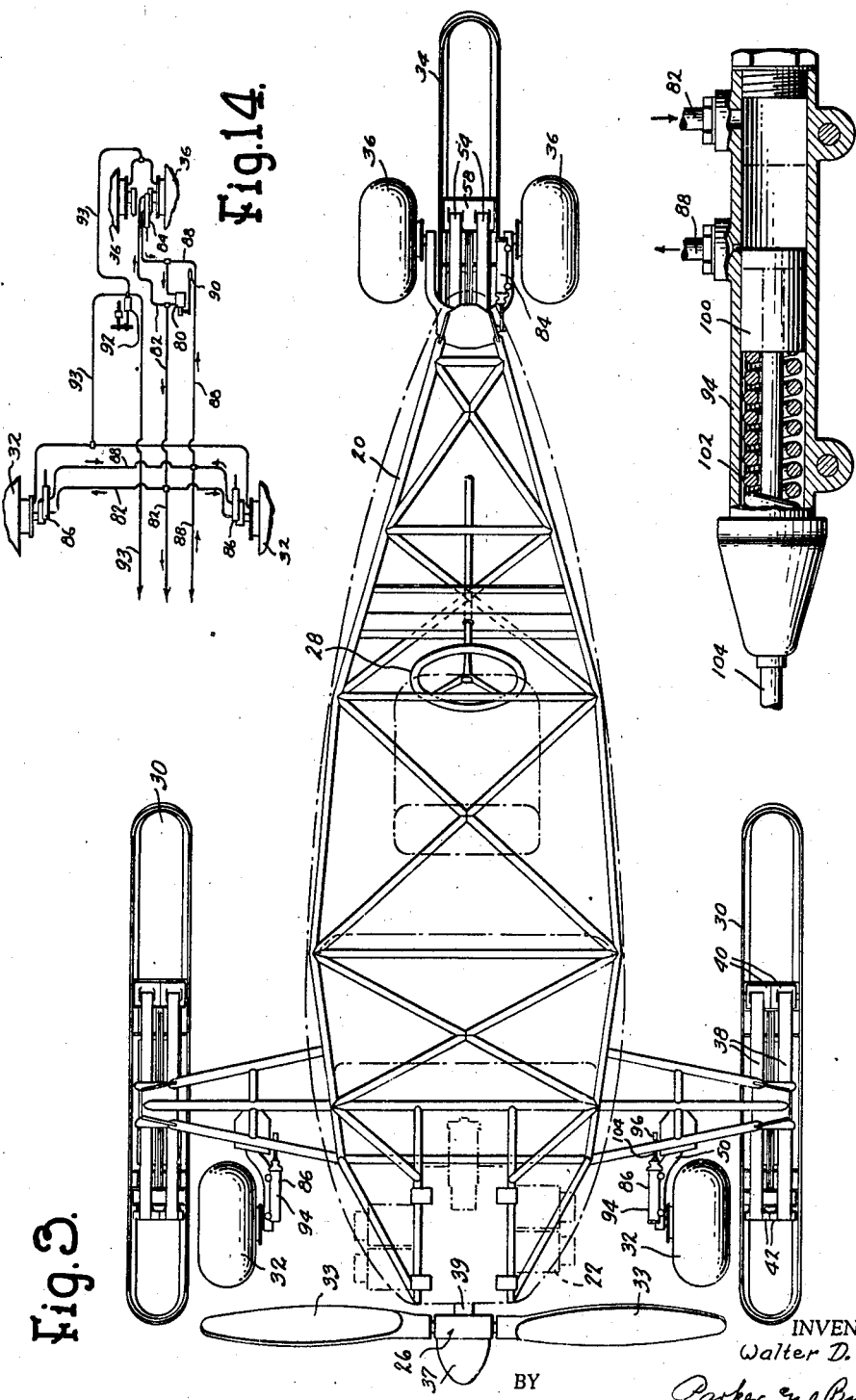
INVENTOR.
Walter D. Marr
BY Parker and Burton
Attorneys Oct. 12, 1943.   W. D. MARR   2,331,561
POWER DRIVEN SLED
Filed May 23, 1941   6 Sheets-Sheet 3

INVENTOR.
Walter D. Marr
BY Parker and Burton
Attorneys

Oct. 12, 1943.    W. D. MARR    2,331,561
POWER DRIVEN SLED
Filed May 23, 1941    6 Sheets-Sheet 4

INVENTOR.
Walter D. Marr,
BY Parker and Burton
Attorneys

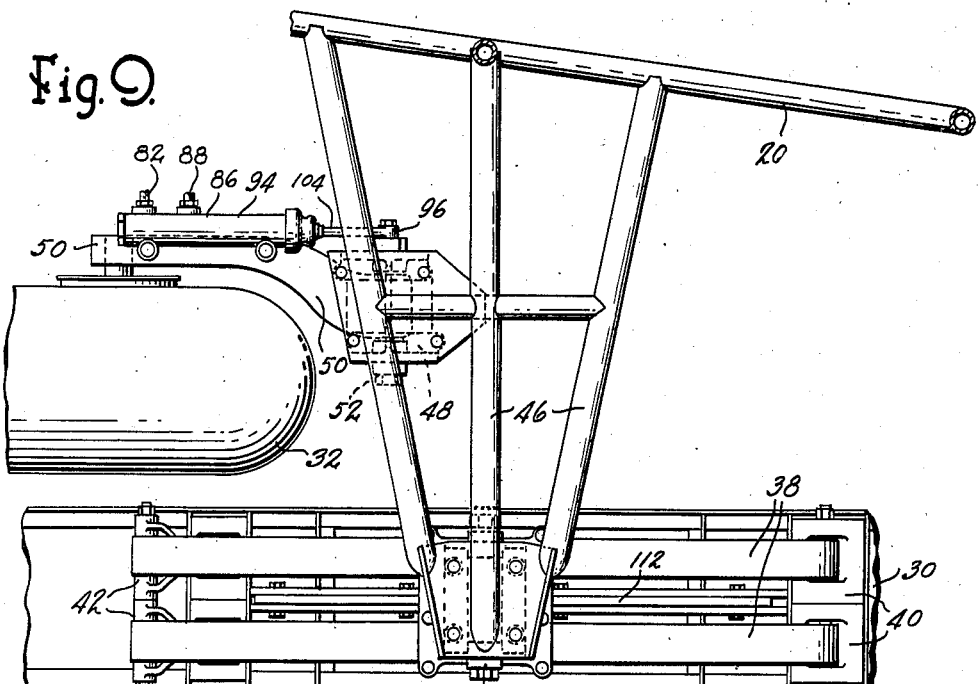
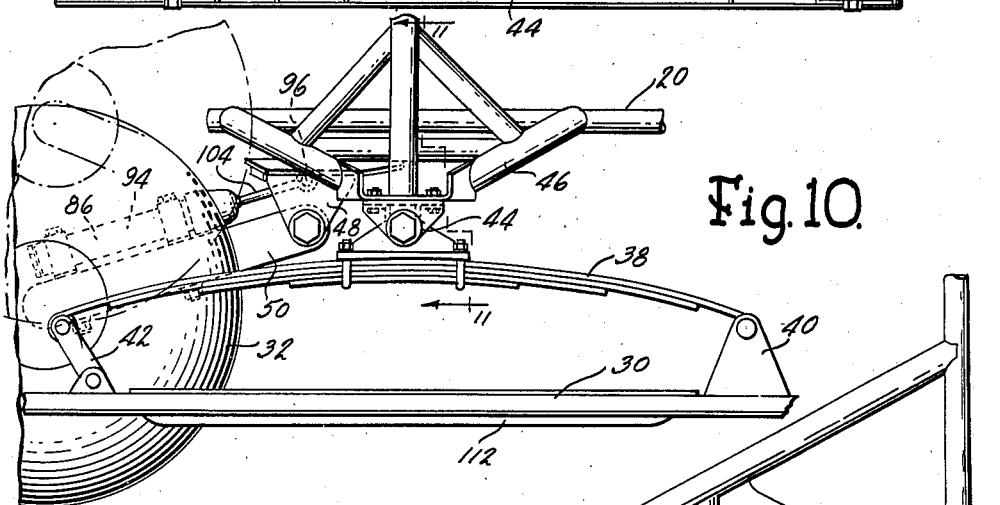
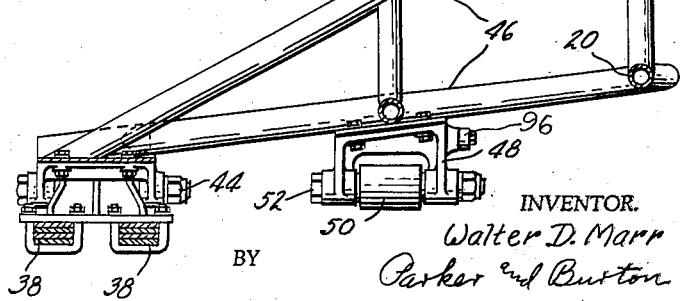

Oct. 12, 1943.  W. D. MARR  2,331,561
POWER DRIVEN SLED
Filed May 23, 1941   6 Sheets-Sheet 6

INVENTOR.
Walter D. Marr
BY Parker and Burton
Attorneys

Patented Oct. 12, 1943

2,331,561

UNITED STATES PATENT OFFICE 2,331,561

POWER DRIVEN SLED

Walter D. Marr, Flint, Mich.

Application May 23, 1941, Serial No. 394,752

8 Claims. (Cl. 180—3)

This invention relates to an improved power driven snow sled adapted for travel over snow, ice, or bare ground.

An object is to provide a snow sled as characterized of light and rugged construction capable of high speed and provided with snow skis, ice runners, and wheels. The vehicle is so constructed that it is easily controlled and may be quickly changed from runner to wheel support or the reverse without the driver leaving the seat. The sled is driven by an air propeller here shown as a pusher disposed in the rear providing clear vision ahead.

An improved feature is that the propeller which is adapted to drive the vehicle ahead may be readily reversed as to angular disposition of blades to act as a brake and hold the sled on a grade.

More particularly the sled is provided with two rear runners and one front steerable runner and with two rear road wheels and two front steerable road wheels. The road wheels are swingably supported to be lifted above the runners or to be depressed therebelow to take the load of the sled from the runners. The two front wheels and the front runners are coupled through fifth wheel mechanism with steering means for swivelling and the front runner and the two front wheels are here shown as connected for swivelling movement in unison.

The several wheels are hydraulically operated for raising and lowering and a meritorious characteristic is that the hydraulic operating mechanism is spring urged to lift the wheels and fluid urged to depress the wheels below the runners to take the load therefrom.

Figure 4:
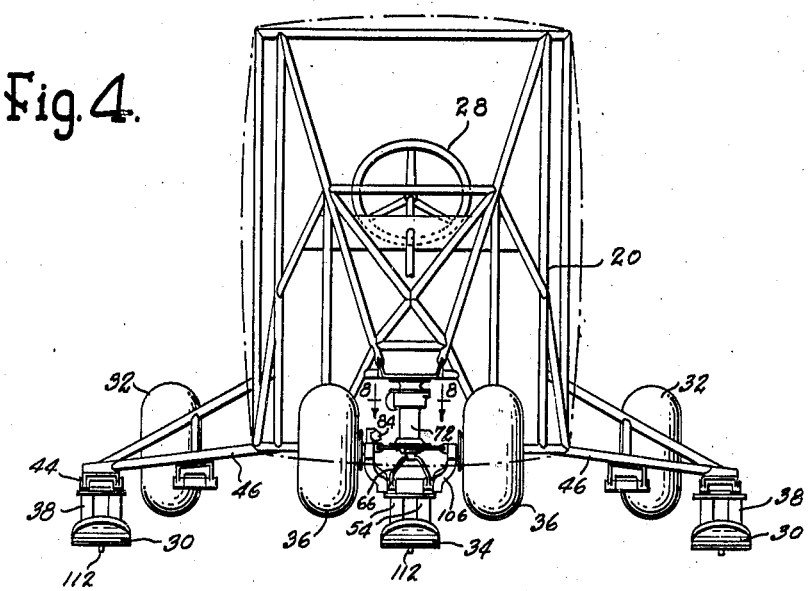
Figures 5, 8:
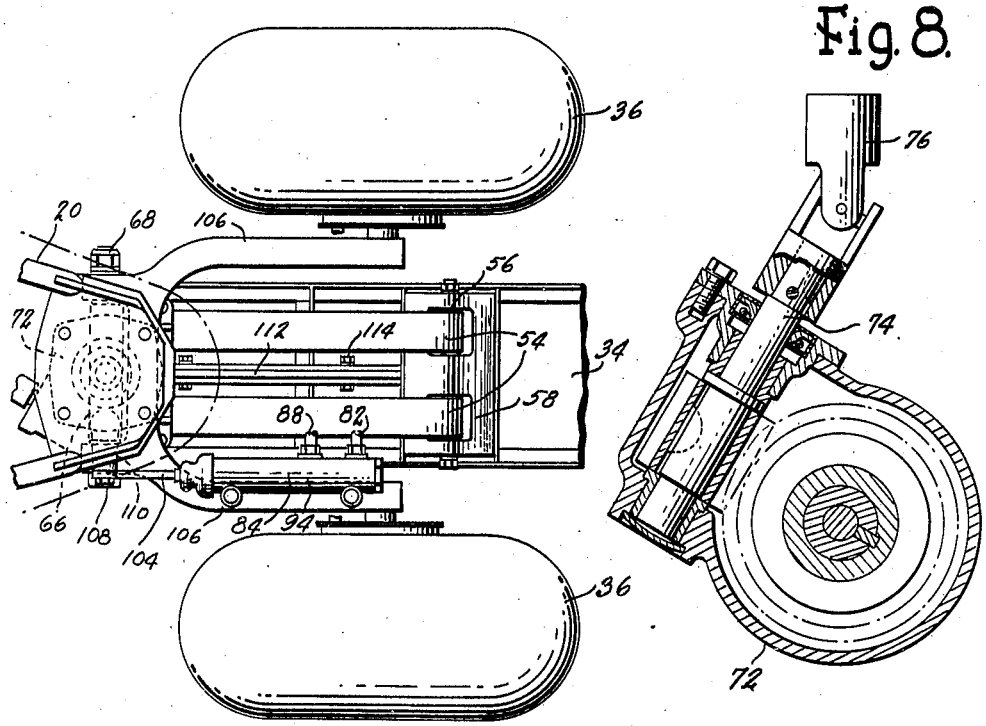
Figure 6:
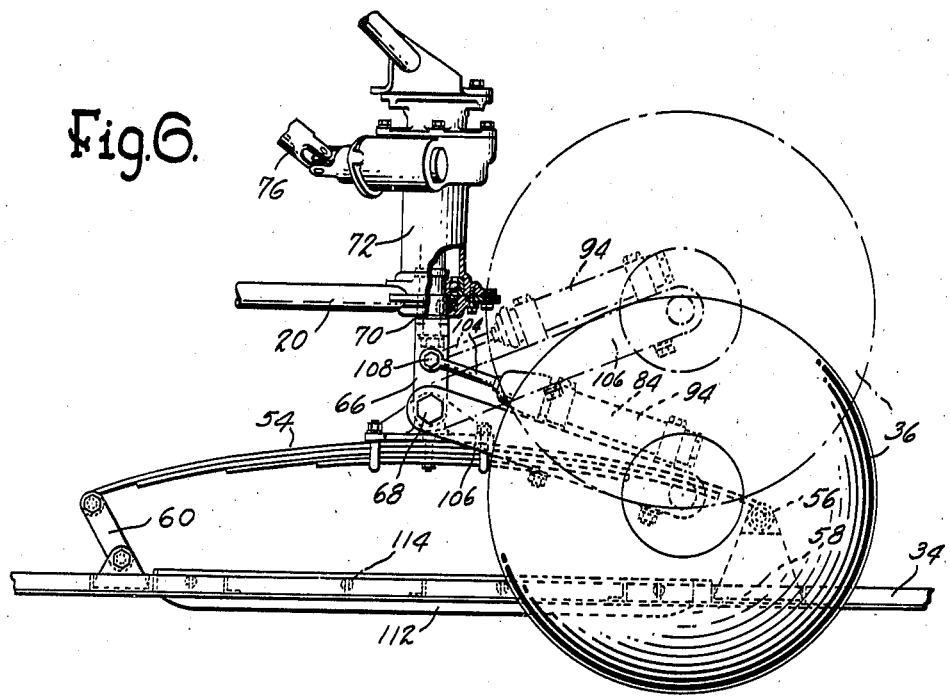
Figure 7:
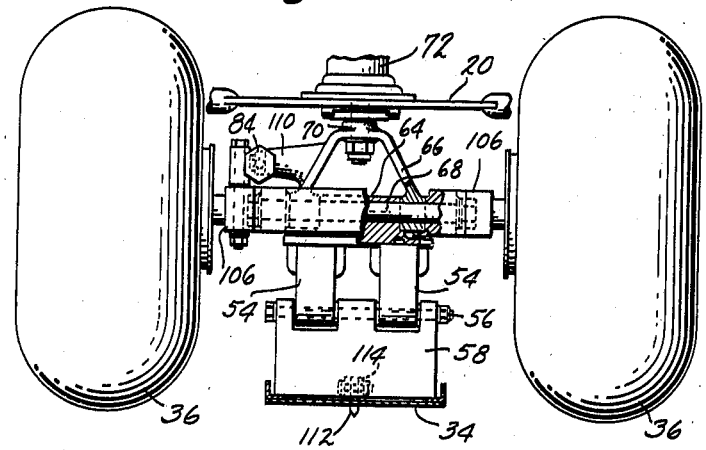
Figure 15:
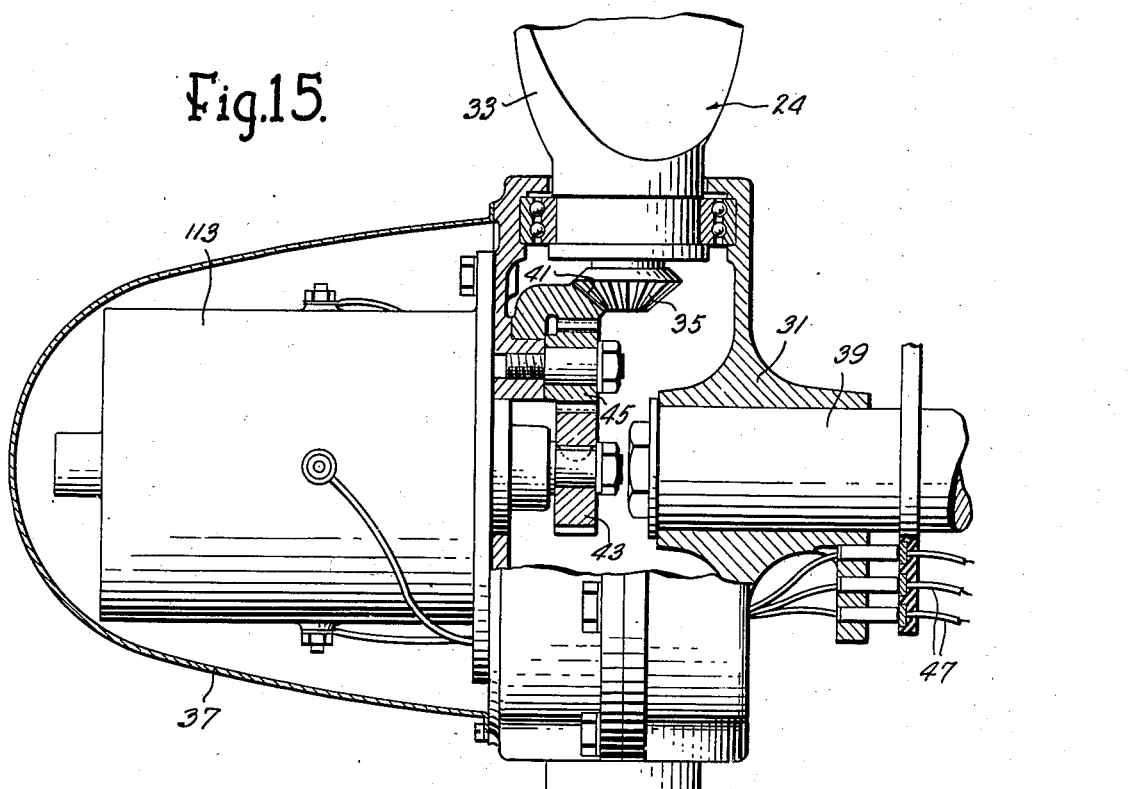
Figure 16:
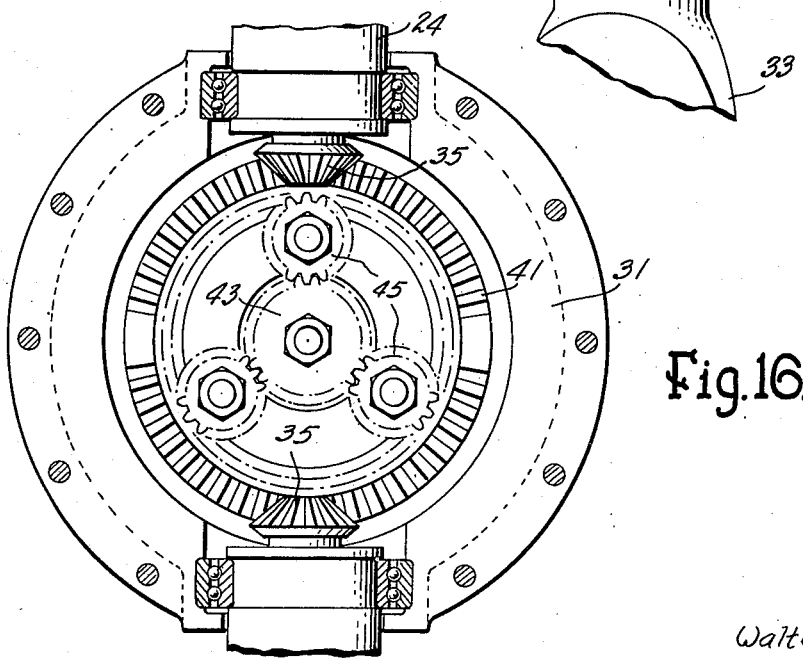

The above objects and others together with various meritorious features and advantages will more fully appear from the following description, appended claims and accompanying drawings, wherein:

Figure 1 is an elevation of a snow sled embodying my invention provided with a trailer, Fig. 2 is a schematic elevation of the snow sled of Fig. 1 enlarged over the Fig. 1 view, Fig. 3 is a plan of the sled shown in Fig. 2, Fig. 4 is a front elevation of the sled of Fig. 2, Fig. 5 is an enlarged fragmentary plane of the front end of the sled of Fig. 4, Fig. 6 is an enlarged fragmentary elevation of the front end shown in Fig. 5 partly broken away, Fig. 7 is a front elevation of a portion of the structure shown in Fig. 6 partly broken away and with the wheels elevated to an intermediate position, Fig. 8 is a section taken on the line 8—8 of Fig. 4, Fig. 9 is a plan of a fragment of the right rear showing a part of the runner and wheel and the support therefor, Fig. 10 is a side elevation of the structure shown in Fig. 9, Fig. 11 is a section taken on the line 11—11 of Fig. 10, Fig. 12 is a section taken on the line 12—12 of Fig. 2, Fig. 13 is a longitudinal section through one of the hydraulic wheel lifting cylinders, and Fig. 14 is a diagram of the hydraulic system coupled with the wheels, Fig. 15 is an elevation partly broken away of mechanism for reversing the angularity of the propeller blades, and Fig. 16 is a section taken on a vertical line through Figure 15 and partly broken away.

One of the purposes for which a sled of this type is adapted to be used is for ski troops and in Fig. 1 the power sled is indicated as provided with a trailer sled and it is apparent that in this manner twelve or more men might be readily transported. It is of course obvious that the power sled is usable alone and that it is adaptable for many different peace time pursuits. Provided with ski runners it can travel rapidly over the snow along the roads or through the fields. Through the use of ice runners it will hold its position on the ice of a lake and will attain very high speeds. The road wheels which are provided permit travel of the sled over roads which have been freed from snow or over bare ground. These road wheels can be raised or lowered by the driver without leaving the driver's seat.

The sled is shown as having a tubular framework 20 for the body similar to that employed in airplane construction. A motor 22 is mounted at the rear and drives an air propeller 24. The body shown is provided with seats for occupants and there is a steering wheel and column 28.

Through suitable reversing mechanism indicated schematically as 26 the angularity of the blades of the propeller may be completely reversed as shown in Fig. 12 so that the propeller will act as a brake to hold the sled on a grade. Such reversing mechanism is shown more in detail in Figs. 15 and 16. The propeller shaft is indicated as 39. A hub 31 is fixed on the shaft to rotate therewith and this hub carries angularly adjustable propeller blades 33 journalled in a suitable support and each provided on its inner end with a gear 35. The hub is hollow as shown in Fig. 15 and the gears 35 are disposed within the interior of the hollow hub.

A reversible electric motor 113 is mounted within a casing 37, which casing is attached to the rear portion of the hub 31 as shown in Fig. 15. This electric motor drives a ring gear 41, which gear is provided through the two opposed complementary arcs of slightly less than 180° each with outer teeth on gear 41 which might be described as arcuate racks one for the gear 35 of each propeller blade. The teeth of one rack mesh with one gear 35 and the teeth of the other rack mesh with the other gear 35.

Another shaft carries a gear 43 which meshes with three internal gears 45 journalled within the hub and within the interior of the ring gear 41 and which gears 45 drive the ring gear 41 through internal teeth on the ring gear as shown in Figs. 15 and 16. The gear reduction ratio is such that the propeller blade torque will not reverse the motor.

Electric control wires 47 lead from the motor 113 to suitable switch mechanism disposed in proximity to the driver's seat whereby the driver may throw the switch to energize the motor to drive the ring gear 41 to reverse the propeller blades throughout the permitted arc of their reversible rotation as determined by the outer teeth on the ring gear. Such outer teeth on the ring gear function as an arcuate rack and the ends of each arcuate toothed portion to determine the two limiting positions of angular adjustment of the blades. The parts are sufficiently strong to withstand the drive of the small electric motor if the switch should accidentally be left on by the operator.

The sled is provided at the rear with two rear runners 30 and two rear road wheels 32. At the front there is a steerable front runner 34 and two front road wheels 36. Each of the rear runners 30 is provided with a pair of leaf springs 38. Each of these springs is secured to the runner at the forward end by a bracket 40 and shackled thereto at the rear by shackle 42. These springs are pivotally articulated as at 44 to the outer end of a tripod support 46 which extends outwardly from the frame of the body as shown in Figs. 3 and 9.

To this same support there is hinged a rear wheel 32. A bracket 48 is secured to the support 46 spaced between its outer end and the body and an arm 50 is pivotally articulated to this bracket at 52. The arm 50 extends rearwardly therefrom. At the outer end of the arm there is mounted a road wheel. The wheel is adapted to be raised or lowered by swinging of the arm about its pivot 52.

At the forward end the front runner is disposed along the longitudinal center line of the vehicle. It is provided with a pair of leaf springs 54. The springs are hinged at the front to the runner as at 56 through the use of a bracket 58. At this rear end the springs 54 are shackled to the runner by shackles 60. These springs 54 are pivotally articulated to fifth wheel mechanism.

There is a spring bed plate 64 (Fig. 7) to which the springs are clipped and this bed plate is pivotally supported between the arms of a supporting fork 66 upon a shaft 68. The shaft extends between the outer ends of these supporting arms and beyond the arms. This supporting fork 66 is secured as at 70 to the lower end of a swivelled steering shaft, which shaft extends vertically through a casing 72 at the front of the vehicle and is coupled at its upper end through worm drive mechanism indicated generally as 74 in Fig. 8 by link 76 extending to the steering column to be actuated to steer the vehicle.

The several wheels are adapted to be raised or forcibly depressed by hydraulic mechanism illustrated diagrammatically in Fig. 14 as comprising a power cylinder 80 having a branched line 82 leading to a front operating piston and cylinder 84 and two rear operating pistons and cylinders 86. A return branched line 88 leads from each of these piston and cylinder structures to the power cylinder 80. A hand lever 90 is provided to actuate a piston in the power cylinder to control the fluid pressure therein.

Hydraulic brake mechanism is illustrated diagrammatically also in Fig. 14. There is a power cylinder 92 provided with a manual control lever. Fluid pressure lines 93 lead from the cylinder to the brakes of the several wheels as shown. This hydraulic brake mechanism is conventional. The hydraulic control mechanism for the operating cylinders to raise and lower the wheels is also well understood but the cylinder and piston construction for each individual wheel is illustrated in detail in Fig. 13.

Fig. 14 shows broken off stub lines 82, 88 and 93 which lines could lead to the road wheels of the trailler shown in Fig. 1 to effect raising and lowering of the wheels as well as braking of the wheels. Through such control the wheels of the snow sled and trailer could be raised and lowered by the driver without leaving the seat.

This piston and cylinder construction comprises a cylinder 94, which in the case of each rear wheel, is secured to and superimposes the wheel supporting arm 50. The piston rod is pivoted at 96 to the bracket to which the arm is pivotally articulated and above the pivotal point of connection of th earm as shown in Fig. 10. It will be seen that as the piston is moved under fluid pressure created within the cylinder to project the piston rod rearwardly therefrom or to increase the overall length of the cylinder and piston that the arm will swing downwardly to depress the wheel. As the piston moves into the cylinder or as the total length of the piston and cylinder is contracted the arm 50 will be raised to elevate the wheel.

Fig. 13 illustrates in detail the structure of one of these piston and cylinder mechanisms. The piston 100 is reciprocable within the cylinder 94 and is held by a spring 102 to draw the piston into the cylinder and to contract the total length of the cylinder and piston. The piston rod is indicated as 104. The fluid intake is at 82 and the exhaust is at 88 as these numerals appear on the diagram and on Fig. 13.

It is apparent, therefore, that the springs 102 are sufficient to raise the wheels to the elevated position and that this position is determined by the position of the outlet to the line 88 from the cylinder. When the piston reaches this point the fluid circulates in the line and this determines the lowermost position of the wheels. The wheels are held depressed by the maintenance of the pressure in the lines.

The front hydraulic piston is mounted upon and superimposes the right arm of a yoke 105. This yoke is pivoted upon the end extensions of shaft 68 beyond the supporting fork 66 and constitutes a part of the fifth wheel mechanism. At its forward ends this yoke is provided with wheel spindles and carries the front wheels 36.

It will be seen, therefore, that the fork support 66 carries the spring bed plate 64 which, in turn, carries the springs 54 and the front runner 34 and it also carries the yoke 106 which carries the front wheels so that the two front wheels and the front runner swivel as a unit in the steering of the vehicle.

The piston rod 104 of the hydraulic piston and cylinder construction is attached at its outer end as at 108 to a bracket 110 secured to the supporting fork 66 and the hydraulic piston and cylinder construction at the front operate in the manner heretofore described in connection with the same mechanisms at the rear wheels to raise and lower the front wheels.

Each ski runner is provided with an ice runner 112 which is vertically adjustable relative to the ski runner as shown particularly in Figs. 6, 7 and 9. The ice runner is raised or lowered and adjustably secured as at 114 at different positions. These runners 112 may be adjusted to depend to such a depth as to hold the sled on snow against sliding sideways by the runner 112 cutting into the snow track packed down by the ski runner.

It is apparent, therefore, that in the operation of the vehicle wheels may be raised or lowered as shown in Fig. 6 through operation of the hydraulic mechanism by the driver from his seat. The wheels may be held depressed to take the load on the wheels instead of on the runners or the wheels may be elevated so that the runners take the load. The vehicle may be steered from the steering mechanism provided and the two front wheels and the front runner swung in unison. The swinging of the front wheels with the front runner facilitates steering in that the wheels do not attempt to establish a straight ahead position through the snow when the runners are swung assuming that the wheels at any time would strike the snow. The propeller may be reversed to serve as a brake to hold the sled on a grade.

What I claim:

1. A snow sled having a pair of rear runners and a steerable front runner, steering mechanism, fifth wheel mechanism mounted upon the front runner and coupled with the steering mechanism to be actuated thereby, a pair of front road wheels carried by arms swingably supported upon the fifth wheel mechanism to be elevated above or depressed below the front runner, a pair of rear road wheels carried by arms swingably supported to be elevated above or depressed below the rear runners, wheel lifting and lowering mechanism for the road wheels including an extensible portion extending linearly and connected with said swingably supported arms, said mechanism being connected therewith and extensible and contractible to lower and raise the arms.

2. In a snow sled, a pair of rear runners, a front runner, a pair of rear wheels swingably mounted to be raised above or depressed below the rear runners, fifth wheel mechanism spring supported upon the front runner and provided with a forwardly extending yoke, front wheels mounted upon the forward ends of the yoke, said yoke being swingably supported to raise the front wheels above or depress them below the front runner, steering means coupled with the fifth wheel mechanism to swivel the same for steering the front wheels and front runner in unison, hydraulic wheel lifting and lowering means extending parallel to one arm of the yoke and connected to the forward end thereof at one end and to the fifth wheel mechanism at the opposite end and operable to raise and lower the wheels.

3. In a snow sled a pair of rear runners, a front runner, a pair of rear wheels swingably mounted to be raised above or depressed below the rear runners, fifth wheel mechanism supported upon the front runner and provided with a forwardly extending yoke, front wheels mounted upon the forward ends of the yoke, said yoke being swingably supported to raise the front wheels above or depress them below the front runner, steering means coupled with the fifth wheel mechanism to swivel the same for steering the front wheels and front runner in unison, wheel lifting and lowering means coupled with the two rear wheels and with the yoke to lift the wheels above the runners or to depress them below the runners to take the load.

4. In a snow sled a pair of rear runners, a front runner, a pair of rear wheels swingably mounted between the rear runners to be depressed therebelow or lifted thereabove, fifth wheel mechanism spring supported upon the front runner and provided with a yoke having arms extending forwardly therefrom upon opposite sides of the runner, a front wheel mounted upon the forward end of each arm of the yoke, said yoke being swingably supported to raise the front wheels above or depress them below the front runner, steering means coupled with the fifth wheel mechanism to swivel the same to turn the front runner and yoke in unison for steering, hydraulic wheel lifting and lowering means spring urged to elevate said wheels above the runner and responsive to fluid pressure to depress the wheels below the runners to take the load therefrom.

5. In a snow sled a pair of rear runners, a front runner, a pair of rear wheels swingably mounted between the rear runners to be depressed therebelow or lifted thereabove, fifth wheel mechanism comprising a bed plate spring supported above and upon the front runner, steering means coupled with the bed plate to swing the same for steering, a yoke pivoted to the bed plate to swing therewith and to be raised and lowered with respect thereto and having arms extending forwardly on opposite sides of the runner, a front wheel mounted on the end of each arm, and means coupled with the yoke operable to raise the wheels above the runner or to depress the wheels therebelow to take the load.

6. A snow sled having a framework supported upon front and rear runners, front and rear road wheels mounted upon arms pivoted to the framework for swingable movement to raise the wheels above the runners or depress the wheels therebelow, wheel lifting and depressing means having a portion connected at one end with one of said arms and extending linearly thereof and pivotally articulated at the opposite end to the framework, said portion being extensible and contractible to swing the arm to raise or lower the wheel carried thereby.

7. A snow sled having supporting runners and supporting wheels, said wheels being swingably mounted to be raised above or lowered below the runners, brake mechanism for the wheels, hydraulic means connected with the wheels operable to raise the wheels above the runners or to depress them below the runners to take the load, a power driven air propeller to drive the sled forward, means coupled with the propeller to reverse the blades thereof to act as a brake to hold the sled on a grade.

8. A snow sled having front and rear runners and front and rear road wheels swingably supported to be raised above the runners or depressed therebelow, a trailer coupled with the snow sled and having supporting runners and swingably supported road wheels adapted to be raised above the runners or to be depressed therebelow, fluid pressure power means coupled with the wheels of the snow sled and with the wheels of the trailer to swingably actuate them to a depressed position below the runners.

WALTER D. MARR.